Figure 2:
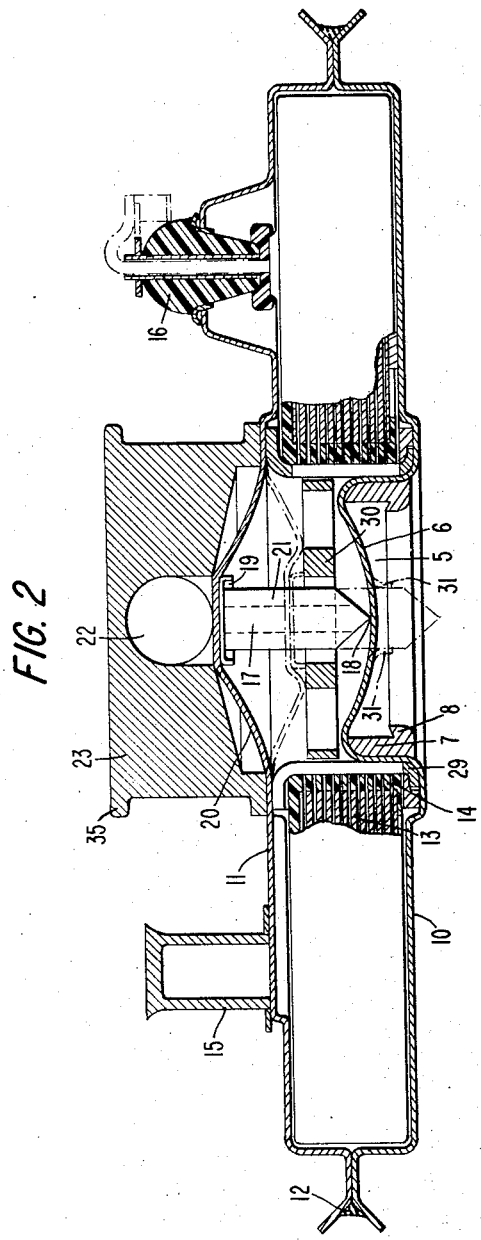

Sept. 26, 1967  K. A. ANDERSSON  3,343,993
DEFERRED ACTION BATTERY COMPRISING INDEPENDENTLY
COMPLETELY CLOSED CONTAINERS
Filed May 20, 1964  2 Sheets-Sheet 1
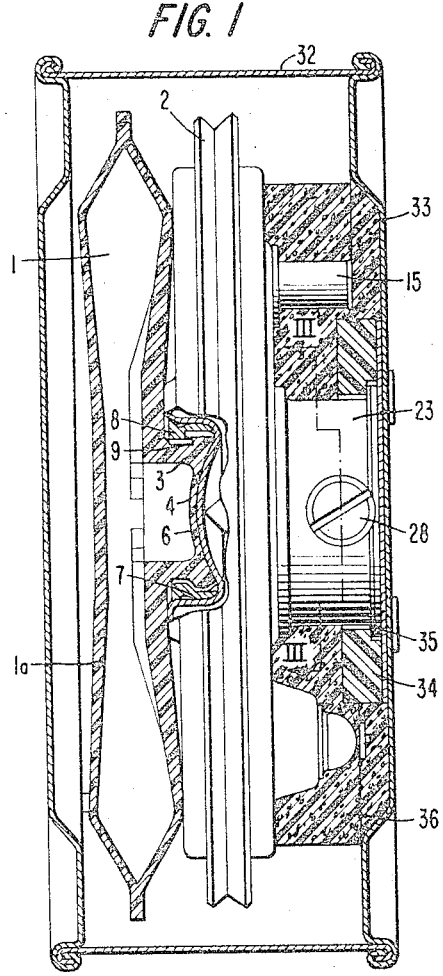
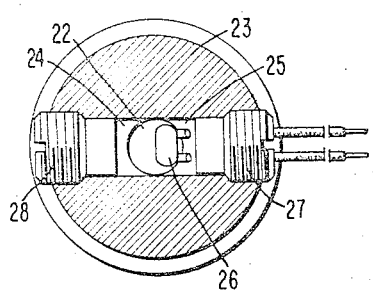
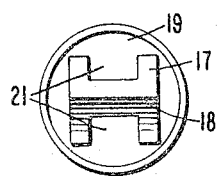
INVENTOR
KARL-AXEL ANDERSSON Sept. 26, 1967  K. A. ANDERSSON  3,343,993
DEFERRED ACTION BATTERY COMPRISING INDEPENDENTLY
COMPLETELY CLOSED CONTAINERS Filed May 20, 1964  2 Sheets-Sheet 2

INVENTOR

KARL-AXEL ANDERSSON

United States Patent Office 3,343,993
Patented Sept. 26, 1967

3,343,993
DEFERRED ACTION BATTERY COMPRISING INDEPENDENTLY COMPLETELY CLOSED CONTAINERS
Karl Axel Andersson, Bofors, Sweden, assignor to Aktiebolaget Bofors, Bofors, Sweden, a Swedish corporation
Filed May 20, 1964, Ser. No. 368,953
Claims priority, application Sweden, May 24, 1963, 5,799/63
11 Claims. (Cl. 136—90)

The invention relates to an electric battery of the type comprising a container enclosing the electrodes of the battery, a second container containing the electrolyte of the battery, and means for transferring the electrolyte from the electrolyte container to the electrode container so that the battery is primed and can generate electric energy.

Batteries of this type are used primarily when the battery is to have a comparatively short period of active operation but must be storable for a considerable time without being destroyed or without deterioration of its electric qualities. Batteries of this type are preferably used in equipments and apparatus, as for instance, mines, projectiles, missiles, satellites and other unmanned electric equipments, for which it is required that the battery be primable by remote control. In all such applications it is a fundamental requisite that the construction of the battery in itself, and especially of its priming mechanism, be such that reliable and safe operation of the battery is not imperiled by external influences, as for instance, large acceleration forces, high pressures, vibrations, prolonged storage, etc.

It is a broad object of the invention to provide a novel and improved battery of the general kind above referred to which when stored in inactive condition has a very long shelf life and can be installed in the inactive condition, and which when to be used can be safely and rapidly primed.

It is also a broad object of the invention to provide a novel and improved battery of the general kind above referred to which, due to its structure and priming mechanism, is highly resistant to vibrations, shocks, changes in pressure or temperature, decelerations and accelerations or other external influences to which the battery may be subjected in the hereinabove-indicated fields of application.

A battery of this type with the abovementioned and other advantageous qualities is obtained according to the invention by providing an electrode container which is hermetically sealed and disposed close to the electrolyte container in a manner such that the facing walls of the two containers lie immediately adjacent to one another. The electrode container contains a penetration member, preferably provided with an edge or a point, which member may be forced to penetrate the closely adjacent wall portions of the two containers and which has a configuration such that after such penetration the electrolyte may pass from the electrolyte container to the electrode container, for instance, through ducts or grooves provided in the penetration member.

The electrolyte container is made of a material which is resistant to the electrolyte. This is unnecessary, however, for the electrode container of the battery, if the time of active operation of the battery is comparatively short. The walls of the electrolyte container are preferably at least partially flexible so that the volume of the container can be considerably reduced by compression of the container. As a result, when the penetration member penetrates the wall portions of the two containers disposed immediately adjacent to one another so that a communication is formed between the containers, the external air pressure will compress the electrolyte container and thereby force the electrolyte into the evacuated electrode container.

In the following pages the invention will be described in greater detail with reference to the accompanying drawing, which shows, by way of example, a preferred form of the battery according to the invention.

In the drawing:
FIG. 1 shows the complete battery partially in an axial cross section;
FIG. 2 is an axial section through only the electrode container of the battery and the priming mechanism;
FIG. 3 is a section along the line III—III of FIG. 1 through a portion of the priming mechanism; and
FIG. 4 shows a preferred form of the penetration member, seen from its sharp end.

As shown in FIG. 1, the battery comprises primarily an eletctrolyte container 1 and an electrode container 2, the latter being shown in greater detail and in section in FIG. 2. In the embodiment of the invention shown in the drawing, these two containers are comparatively thin boxes of circular cross section. The electrolyte container contains, when the battery is not yet primed, all the electrolyte of the battery and consists of a material, preferably a plastic material, which is resistant to the electrolyte. Suitable plastics are, for instance, fluorethene plastics, in particular fluorethene propene.

Furthermore, the electrolyte container has at least partially flexible walls so that its inner volume can be reduced by compression of the container. Thus, in the embodiment shown the left-hand wall 1a (FIG. 1) of the electrolyte container can be pressed against the opposite wall of the container, thereby forcing the electrolyte out of the container when the battery is primed, as will be more fully described hereinafter. This opposite wall has in its center a short, projecting, cylindrical neck 3 with a comparatively thin end wall 4. This neck is inserted in a corresponding central cylindrical recess 5 in one side wall of the electrode container 2 so that the end wall 4 of the cylindrical neck 3 of the electrolyte container 1 lies immediately adjacent to the somewhat concave bottom 6 of the recess 5 in the electrode container 2. Within this recess 5 a ring 7 is attached to the wall of the electrode container, and this ring 7 is provided with an inner flange 8 overlapping a corresponding annular collar 9 on the neck 3 of the electrolyte container so that the electrolyte container 1 is firmly secured to the electrode container 2. As the plastic material of the electrolyte container 1 is resilient, in this manner a tight fit is also achieved around the periphery of the neck 3. If necessary, this fit can be further improved by the application of a suitable glue or adhesive between the neck 3 of the electrolyte container 1 and the inner side of the recess 5 in the electrode container 2.

The electrode container 2, as is apparent in FIG. 2, comprises two parts 10 and 11 which are joined along their periphery by, for instance, a soldered seam 12. The electrode container contains the annular electrode plates 13 of the battery, which are maintained in position and isolated from each other by the plastic material 14 in which the electrodes are encased. The electrode container consists preferably of metal or any other material through which no diffusion will take place, and is provided with a short pipe 15 through which the container is evacuated subsequent to the assembling of the container. The container is also provided with an electric inlet 16 for one terminal of the battery, the other terminal of the batter preferably consisting of the metal wall of the container.

The priming mechanism of the battery comprises a rod-shaped member 17 disposed in the central portion of the electrode container 2 not occupied by the electrode plates 13. The end of knife-shaped member 17 which faces the electrolyte container is provided with an edge 18, which is symmetrically disposed with respect to the rod-shaped member and perpendicular to the longitudinal axis of the member, while the opposite end of the member is provided with a plate or shoulder 19 which rests against a bulging portion 20 of the opposite wall 11 of the electrode container. The opposite side surfaces of the member 17 are continued by the flanks of the edge 18 and are provided with longitudinal grooves 21 which open into the edge flanks on opposite sides of the edge 18 at the foremost end of the member. The member 17 is consequently shaped like a knife, which, when displaced with a sufficient force to the left as seen in FIG. 1 and downwardly as seen in FIG. 2, will with its edge 18 penetrate the wall portion 6 of the electrode container 2 as well as the end wall 4 of the cylindrical neck 3 of the electrolyte container 1, whereafter the grooves 21 in the two opposite sides of the knife 17 will form flow paths or conduits, through which the electrolyte present in the electrolyte container 1 will flow into the evacuated electrode container 2. The flow of the electrolyte is assisted by external air pressure or force, which compresses the electrolyte container 1. The electrode container is preferably partly evacuated so that the electrolyte will be sucked into the container through grooves 21. In this way the battery is primed and will start to generate electric energy.

The bulging wall portion 20 of the electrode container at the rear end of the knife 17 is deformable so that it can be pressed in by a force applied to the outer side of the electrode container to an incurved position in the electrode container so that the forward end of the knife 17 is pressed through the wall portions 6 and 4 in the electrode container and the electrolyte container respectively, in the manner described above. In the embodiment of the invention shown in the drawings the necessary force for the pressing in of the wall portion 20 and for pressing the knife 17 through the wall portions 6 and 4 of the two containers is supplied by an explosive charge situated on the outside of the wall portion 20 of the electrode container, which charge is fired when the battery is to be primed. The explosive charge is disposed within a chamber 22 in a rigid body 23 attached to the outside of the electrode container outside the bulging wall portion 20. The chamber 22 is open toward the wall portion 20 of the electrode container but otherwise closed, with the exception of two threaded bores 24 and 25, in one of which an electric fuze is inserted by means of a threaded plug 27, whereas the other bore is closed by a threaded plug 28 carrying the explosive charge. When the fuze is activated by any suitable conventional means, such as a signal sent to the fuze, and thus the explosive charge carried by the plug 28 is fired, the explosion pressure or shock wave in the chamber will press the deformable wall portion 20 of the electrode container inward and thus propel the knife 17 through the wall portions 6 and 4 of the two containers to the position shown with dot-and-dash lines in FIG. 2, so that the battery is primed.

The rest of the electrode container is protected against deformation by a ring 29 fitted within the container around the central portion thereof. This ring 29 will also protect the electrode plates 13 against being affected by any forces when the explosive charge is fired. To this ring 29 an annular partition wall 30 is attached, which forms a stop face for the collar 19 of the knife 17 so that the knife 17 is prevented from passing completely through the wall portions 6 and 4 of the two containers. As the wall portion 20 of the electrode container will be caved into the electrode container when the explosive charge has been fired, the knife 17 cannot be removed from the openings formed by it in the wall portions 4 and 6 of the containers due to external forces acting upon the battery, as for instance, vibrations or acceleration forces.

As the forward end of the knife 17 is symmetrical, the knife will not be deflected or otherwise influenced by any lateral forces when penetrating the wall portions 4 and 6, but the knife will be given a substantially lengthwise movement along its initial positional axis, in spite of the fact that it has no lateral guidance except in the openings made by the knife in the wall portions 4 and 6. Due to the special shape of the forward end of the knife 17 described above, the knife, when it penetrates the wall portions 4 and 6, will cut out and turn up flaps 31 from the wall portion 6 of the electrode container on both sides of the knife in the manner shown in dot-and-dash lines in FIG. 2. These flaps 31 will substantially prevent any air being sucked into the electrode container through the grooves 21 in the knife 17 and also the escape of any electrolyte between the wall portions 4 and 6. However, even if a small amount of air should be sucked into the electrode container when the battery is primed, this will not have any serious consequences.

As is evident from FIG. 1, the different parts of the battery are completely enclosed in an outer cylindrical casing 32 and are attached to one side wall 33 in this casing by means of a ring 34 which is attached with screws to the inside of the wall 33 and grips a flange 35 on the body 23, and also by means of a body 36 of foam plastic.

It is evident also that embodiments of the invention other than the one described are possible within the scope of the invention. Thus it is of course unnecessary that the force applied to the outside of the electrode container for the priming of the battery be supplied by means of an explosive charge which is fired; the bulging portion 20 of the wall of the electrode container can also be pressed into the electrode container so that the knife 17 is caused to penetrate the wall portions 4 and 6 by, for instance a mechanical percussion member or similar means.

What is claimed is:

1. A deferred-action electric battery comprising a set of electrodes, a first closed and partly evacuated container housing said electrodes, a second closed container independent and separate from the first container and containing an electrolyte, said containers being mounted in fixed positions in reference to each other in which wall portions thereof are closely adjacent each other, an elongated penetration member including a lengthwise duct, said member being disposed lengthwise movable within said first container, and activating means disposed externally of said containers and coacting with said penetration member through a wall portion of said first container, said activating means when operated forcing said penetration member through said adjacent wall portions and into a position partly extending into said second container in which position said duct provides a flow path for the electrolyte from the second container into the first container, thereby priming the battery.

2. An electric battery according to claim 1, wherein said first container is substantially rigid and evacuated and said second container has flexible wall portions to effect compression of the second container in response to an external pressure in excess of the internal pressure within the second container, thereby promoting the flow of electrolyte through said duct from the second container into the first container when said penetration member is in its position protruding into the second container.

3. An electric battery according to claim 1, wherein said activating means comprise an explosive charge, means for detonating said charge, and means for applying a shock wave generated by detonation of the charge upon said penetration member to propel the same into said penetration position.

4. A deferred-action electric battery comprising a set of electrodes, a closed substantially rigid and partly evacuated first container housing said electrodes, a second closed container having at least partially flexible walls so as to be compressible by an outer pressure and containing an electrolyte, the electrode container and the electrolyte container being independent and separate from each other and mounted in a fixed side-by-side relationship in which walls of said containers facing each other are at least over a portion of their surfaces in immediate proximity to each other, and a penetration member disposed within the electrode container and movable therein with respect to said container for moving said member into a position penetrating said wall portions of the two containers in proximity to each other and protruding into the electrolyte container, said penetration member including an axial duct opening a flow passage for said electrolyte from said electrolyte container to said electrode container in the position of said member penetrating said facing wall portions, thereby priming the battery.

5. A battery as claimed in claim 4, wherein said electrolyte container has a deformable wall portion inwardly deflectable by an external pressure applied thereto, thereby reducing the volume of said container to increase the outflow of electrolyte therefrom through said passage.

6. A battery as claimed in claim 4, wherein said penetration member is an elongated member and is disposed lengthwise movable within said electrode container with its longitudinal direction substantially perpendicular to said facing wall portions of the two containers, the end of said member facing toward said wall portions terminating in an edge and the other end being close to a wall of the electrode container opposite said facing wall portions, said opposite wall of the electrode container having a deformable portion juxtaposed to said rear end of said penetration member, and activating means for applying a pressure force to the outside of said deformable wall portion to displace the penetration member in the electrode container so that said edged end thereof is pressed through said facing wall portions of the containers and into the electrolyte container for opening said flow passage.

7. A battery as claimed in claim 6, comprising a stationary stop member within said electrode container for limiting the movement of said penetration member and the deformation of said deformable wall portion when the battery is being primed, to prevent said penetration member from passing completely through the facing wall portions of said two containers.

8. An electric battery comprising, in combination: a first and a second container, said containers being separate from each other, independently completely closed and sealed, the first container having substantially stiff walls and being partly evacuated and the second container having at least partially flexible walls so as to be compressible by an ambient atmospheric pressure, a set of electrodes inside said first container and an electrolyte in said second container, said first and second containers being disposed in a fixed side-by-side relationship and having facing walls in immediate proximity to each other at least over a portion of their surfaces, a rod-shaped penetration member having a sharp end and an opposite end and grooves extending between said opposite end and said sharp end, said penetration member being disposed inside said first container with its longitudinal direction substantially perpendicular to said facing wall portions of said first and second containers and with said sharp end of the member adjacent to said facing wall portions and said opposite end of the member close to a wall of said first container opposite said facing wall portions, said opposite wall of said first container having a permanently deformable portion juxtaposed said opposite end of said penetration member, a rigid body attached to said opposite wall of said first container outside of said deformable wall portion so as to protect said deformable wall portion against external impacts and shocks, said rigid body having a cavity only open toward said deformable wall portion, and an explosive charge housed in said cavity.

9. A battery as claimed in claim 8, wherein said deformable wall portion of said opposite wall of said first container has in its normal position an outwardly bulged configuration in reference to said first container and is deflectable by detonation of said explosive charge into a permanent deflected position with an inwardly bulged configuration in reference to said first container, and a stationary stop member within said first container limits the movement of said penetration member and the deflection of said deformable wall portion by detonation of said explosive charge.

10. A battery as claimed in claim 8, wherein said penetration member has a rectangular cross section and said sharp end of said member terminates in a central edge extending parallel to two opposite sides of the member and perpendicularly to the longitudinal axis of the member, said grooves in said member being disposed in said two opposite sides of the member.

11. A battery as claimed in claim 8, wherein said second container has a protruding neck portion with a comparatively thin end wall, said neck portion projecting into a corresponding recess in a wall portion of said first container and being fitted in said recess with said end wall of said neck portion disposed closely to a bottom wall of said recess, a ring provided with an internal flange attached to said wall portion of said first container within said recess, and an annular collar on said neck of said second container, said internal flange on said ring overlapping said annular collar on said neck.

References Cited
UNITED STATES PATENTS 3,173,812    3/1965    Klein _____ 136—90
3,239,385    3/1966    Meyers _____ 136—90

WINSTON A. DOUGLAS, *Primary Examiner.*

B. OHLENDORF, A. SKAPARS, *Assistant Examiners.*